(12) United States Patent
Mori et al.

(10) Patent No.: US 9,364,792 B2
(45) Date of Patent: Jun. 14, 2016

(54) CATALYST, METHOD AND APPARATUS FOR REMOVING NITROGEN OXIDE

(75) Inventors: Takayuki Mori, Sagamihara (JP); Mari Ono, Sagamihara (JP)

(73) Assignee: TOKYO ROKI CO., LTD., Yokohama-shi, Kanagawa (JP)

(*) Notice: Subject to any disclaimer, the term of this patent is extended or adjusted under 35 U.S.C. 154(b) by 461 days.

(21) Appl. No.: 12/438,886

(22) PCT Filed: Aug. 23, 2007

(86) PCT No.: PCT/JP2007/066365
§ 371 (c)(1),
(2), (4) Date: Sep. 15, 2009

(87) PCT Pub. No.: WO2008/023762
PCT Pub. Date: Feb. 28, 2008

(65) Prior Publication Data
US 2010/0111793 A1    May 6, 2010

(30) Foreign Application Priority Data
Aug. 25, 2006  (JP) ................ 2006-229330

(51) Int. Cl.
*B01J 23/00* (2006.01)
*B01J 23/10* (2006.01)
*B01D 53/94* (2006.01)
(Continued)

(52) U.S. Cl.
CPC ........ *B01D 53/9418* (2013.01); *B01D 53/8628* (2013.01); *B01J 23/002* (2013.01);
(Continued)

(58) Field of Classification Search
USPC ............................ 502/304, 308, 35, 300, 302
See application file for complete search history.

(56) References Cited

U.S. PATENT DOCUMENTS

| | | | |
|---|---|---|---|
| 5,552,128 A | 9/1996 | Chang et al. | |
| 5,733,837 A * | 3/1998 | Nakatsuji | B01D 53/8628 423/239.1 |

(Continued)

FOREIGN PATENT DOCUMENTS

| | | |
|---|---|---|
| EP | 0 960 649 A2 | 12/1999 |
| EP | 1 516 855 A1 | 3/2005 |

(Continued)

OTHER PUBLICATIONS

Notification of Reasons for Rejection in corresponding Japanese Application No. 2006-229330 dated Dec. 15, 2009.

(Continued)

*Primary Examiner* — James McDonough
(74) *Attorney, Agent, or Firm* — Finnegan, Henderson, Farabow, Garrett & Dunner, LLP

(57) ABSTRACT

A catalyst having superior heat resistance and being capable of efficiently removing a nitrogen oxide, a removing method using the same, an apparatus including the catalyst described above, and the like are provided. A complex metal oxide containing tungsten, zirconium, and cerium has superior heat resistance and is capable of efficiently removing a nitrogen oxide in the presence of ammonia, the content of cerium oxide and the content of tungsten oxide being 10 to 30 percent by weight and 5 to 14 percent by weight, respectively. Hence, a catalyst which includes a complex metal oxide containing tungsten oxide, zirconium oxide, and cerium oxide, in which the content of the cerium oxide and the content of the tungsten oxide are 10 to 30 percent by weight and 5 to 14 percent by weight, respectively, is effectively used to remove a nitrogen oxide.

9 Claims, 2 Drawing Sheets

(51) Int. Cl.
    *B01D 53/86*       (2006.01)
    *B01J 23/30*       (2006.01)
    *B01J 37/03*       (2006.01)
    *B01J 35/10*       (2006.01)
    *B01J 37/02*       (2006.01)

(52) U.S. Cl.
    CPC ......... *B01J 23/30* (2013.01); *B01J 37/03* (2013.01); *B01D 2251/2062* (2013.01); *B01D 2255/2065* (2013.01); *B01D 2255/20715* (2013.01); *B01D 2255/20776* (2013.01); *B01D 2255/407* (2013.01); *B01D 2255/9207* (2013.01); *B01J 35/1014* (2013.01); *B01J 37/0215* (2013.01); *B01J 2523/00* (2013.01)

(56) References Cited

U.S. PATENT DOCUMENTS

| | | | |
|---|---|---|---|
| 2004/0184978 A1* | 9/2004 | Nakatsuji | B01D 53/9413 423/239.1 |
| 2006/0025301 A1* | 2/2006 | Reddy | B01J 21/063 502/304 |
| 2008/0038174 A1* | 2/2008 | Mori | B01D 53/9413 423/237 |
| 2010/0111793 A1* | 5/2010 | Mori | B01D 53/8628 423/239.1 |

FOREIGN PATENT DOCUMENTS

| | | |
|---|---|---|
| JP | H2-56250 | 2/1990 |
| JP | 11-342334 A | 12/1999 |
| JP | 2003-290658 A | 10/2003 |
| JP | 2005-238195 A | 9/2005 |
| JP | 2005-238196 | 9/2005 |

OTHER PUBLICATIONS

Extended European Search Report for European Patent Application No. 07 805 994.6 (Publication No. EP 2072120) dated Mar. 11, 2011.

\* cited by examiner

CATALYST, METHOD AND APPARATUS FOR REMOVING NITROGEN OXIDE

CROSS-REFERENCE WITH RELATED DOCUMENT

This application claims the benefit of Japanese Patent Application JP 2006-229330 filed on Aug. 25, 2006, the entire contents of which are incorporated herein by reference.

TECHNICAL FIELD

The present invention relates to a catalyst for removing a nitrogen oxide in the presence of ammonia, a method for removing a nitrogen oxide using the same, and an apparatus including the above catalyst.

BACKGROUND ART

Heretofore, as shown in the following formulas (1) and (2), a catalyst used for denitration by reduction of a nitrogen oxide in the presence of ammonia has been developed. For example, a catalyst containing tungsten oxide, zirconia, and a metal, such as a rare earth metal, as an active ingredient (Japanese Patent Application Laid-open Publication No. 2005-238196; PCT International Application Publication WO 05/082494) and a catalyst containing zirconia, tungsten oxide, and cerium oxide (Japanese Patent Application Laid-open Publication No. Hei2-56250) have been disclosed.

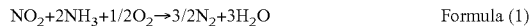

$$NO_2+2NH_3+1/2O_2 \rightarrow 3/2N_2+3H_2O \quad \text{Formula (1)}$$

$$NO+NH_3+1/4O_2 \rightarrow N_2+3/2H_2O \quad \text{Formula (2)}$$

DISCLOSURE OF INVENTION

Problems to be Solved by the Invention

Although various nitrogen-oxide removal catalysts have been developed as described above, development of a nitrogen-oxide removal catalyst which can efficiently remove a nitrogen oxide and which has superior heat resistance is desired under the present circumstances.

Objects of the present invention are to provide a catalyst which has superior heat resistance and which can efficiently remove a nitrogen oxide, a removing method using the same, an apparatus including the catalyst described above, and the like.

Means for Solving the Problems

The inventors of the present invention found that in a catalyst containing cerium oxide, zirconium oxide, and tungsten oxide, when the concentration of the cerium oxide was in the range of 10 to 30 percent by weight, superior heat resistance and catalytic activity (ability of removing a nitrogen oxide in the presence of ammonia) were obtained, and in particular, when the concentration of the tungsten oxide is in the range of 5 to 14 percent by weight, the most superior heat resistance and catalytic activity were obtained; the present invention was thus made.

That is, a nitrogen-oxide removal catalyst according to the present invention is a catalyst for removing a nitrogen oxide in the presence of ammonia and contains a complex metal oxide composed of tungsten oxide, zirconium oxide, and cerium oxide, in which the content of the cerium oxide is 10 to 30 percent by weight, and the content of the tungsten oxide is 5 to 14 percent by weight. The nitrogen-oxide removal catalyst according to the present invention preferably has a BET specific surface area of 30 m²/g or more. In addition, the nitrogen-oxide removal catalyst according to the present invention may be in the form of a powder or may be supported by a honeycomb carrier.

A method for removing a nitrogen oxide according to the present invention includes a step of bringing a nitrogen oxide and ammonia into contact with the above nitrogen-oxide removal catalyst for denitration by reduction.

An apparatus for removing a nitrogen oxide according to the present invention includes the above nitrogen-oxide removal catalyst.

BEST MODES FOR CARRYING OUT THE INVENTION

Figure 1:
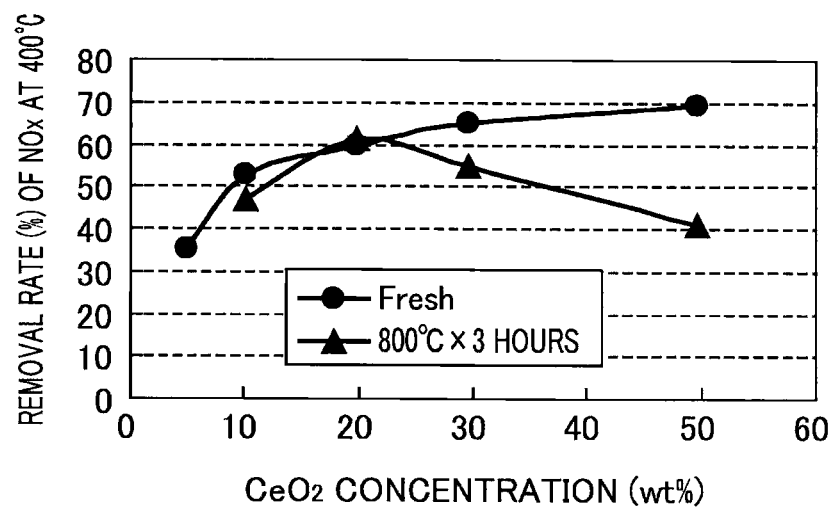
FIG. 1 is a view showing the results obtained by examination of the change in nitrogen-oxide removal rate with the concentration of cerium oxide contained in a catalyst, according to one example of the present invention.

Embodiments for carrying out the present invention which was made based on the above findings will be described in detail with reference to examples.

==Nitrogen-Oxide Removal Catalyst of the Present Invention==

As described in the examples, since a complex metal oxide containing cerium oxide, zirconium oxide, and tungsten oxide, the content of cerium oxide being 10 to 30 percent by weight and the content of tungsten oxide being 5 to 14 percent by weight, can most efficiently remove a nitrogen oxide in the presence of ammonia and has superior heat resistance, the complex metal oxide is effectively used as a nitrogen-oxide removal catalyst. This nitrogen-oxide removal catalyst may be composed of cerium oxide, zirconium oxide, and tungsten oxide.

In addition, a nitrogen-oxide removal catalyst including a complex metal oxide is effectively used, for example, for a method for removing a nitrogen oxide in which a nitrogen oxide and ammonia are brought into contact with each other to denitrate the nitrogen oxide by reduction, and for an apparatus (such as a muffler including the nitrogen-oxide removal catalyst) for removing a nitrogen oxide, in particular, a nitrogen oxide that generates when fuel, such as diesel oil or coal, burns. In order to remove a nitrogen oxide, the presence of ammonia is necessary in a reaction field (region in which the nitrogen-oxide removal catalyst and a nitrogen oxide are both present), and for this purpose, a denitration reducing agent may be added (charged) to the reaction field. As the denitration reducing agent, for example, an ammonia source, such as ammonia, aqueous ammonia (ammonia in water), or liquefied ammonia, may be used; however, in consideration of environment and the like, an ammonia precursor capable of generating ammonia is preferably used. As the ammonia precursor, for example, urea, a urea aqueous solution, or the like capable of generating ammonia by pyrolysis may be used.

The catalyst used for removing a nitride oxide may be powdered by a known pulverizer such as an atomizer or a pin mill or may be supported by a carrier substrate (such as a honeycomb or a porous carrier substrate); however, in view of nitride oxide removal efficiency, the catalyst having a BET specific surface area of 30 m²/g or more is preferable, and the catalyst having a BET specific surface area of 39 m²/g or more is particularly preferable. A known method may be used for loading the nitrogen-oxide removal catalyst on a carrier substrate.

==Manufacturing of Nitrogen-Oxide Removal Catalyst of the Present Invention==

The nitrogen-oxide removal catalyst of the present invention can be manufactured as follows;

A precipitate can be obtained by adding an alkaline solution (such as aqueous ammonia) to an aqueous solution containing a cerium salt (10 to 30 percent by weight in the form of cerium oxide), a zirconium salt, and water, to adjust its pH at 7.0 or more. The precipitated can be collected, for example, by a solid-liquid separation method such as a filtration method. After that, the precipitate is impregnated with a solution of a soluble tungsten compound (5 to 14 percent by weight in the form of tungsten oxide) and then fired at a temperature of 400 to 900° C. to give the desired product.

As the soluble tungsten compound described above, for example, a soluble tungsten salt, such as ammonium metatungstate or ammonium paratungstate, or a mixture of two or more of soluble tungsten salts may be used.

As the cerium salt described above, for example, an inorganic acid salt such as a nitrate salt, a sulfate salt, or a chloride of cerium, or an organic acid salt such as an acetate or an oxalate of cerium, may be used. More specifically, for example, cerium nitrate, cerium chloride, cerium sulfate, cerium ammonium, or a mixture containing at least two thereof may be used.

As the zirconium salt described above, for example, an inorganic acid salt such as a nitrate salt, a sulfate salt, or a chloride of zirconium, an organic acid salt such as a zirconium acetate, an oxozirconium salt, or basic zirconium sulfate may be used. More specifically, for example, zirconium nitrate, zirconium sulfate, zirconium chloride, zirconium acetate, zirconium oxynitrate, zirconium oxychloride, $ZrOSO_4 \cdot ZrO_2$, $5ZrO_2 \cdot 3SO_3$, $7ZrO_2 \cdot 3SO_3$, or a mixture containing at least two thereof may be used.

In this embodiment, the reason the pH is adjusted to 7.0 or more by an alkaline solution is that a precipitate cannot be obtained when the pH is less than 7.0, In addition, the reasons the firing temperature is set in the range of 400 to 900° C. are that when the temperature is less than 400° C., a thermally unstable compound generates, and that when the temperature is more than 900° C., since the BET specific surface area decreases to less than 30 m²/g, a nitrogen oxide cannot be efficiently removed in the presence of ammonia.

EXAMPLES

Hereinafter, the present invention will be specifically described with reference to the examples. However, the aim of the following examples is to explain the present invention and the examples do not limit the scope of the invention.

Example 1

A zirconium sulfate solution (20 percent by weight in the form of $ZrO_2$) in an amount of 20 to 45 g and a cerium nitrate solution (20 percent by weight in the form of $CeO_2$) in an amount of 2.5 to 25 g were mixed with one liter of water for dilution, so that various solutions were prepared. Subsequently, after an alkaline solution (aqueous ammonia) was added to each of the various solutions to adjust their pH in the range of 7.0 to 10.0, each precipitate was collected by filtration. After each precipitate thus collected was impregnated with 0 to 7 g of an ammonium metatungstate solution (50 percent by weight in the form of $WO_3$), firing was performed at a temperature of 400 to 1,100° C., followed by pulverization, so that each catalytic powder was obtained.

The components of metal oxides and the concentrations of sulfate in each catalyst thus obtained were measured by a fluorescent x-ray analytical method (component measurement method for the various metal oxides by RIX3100 manufactured by Rigaku Corporation) and by a combustion-infrared spectroscopic method (concentration measurement method for the sulfate by EMIA-520 manufactured by Horiba Ltd.). In addition, by using a flow-type specific surface area automatic analyzer, Flowsoap Model 2300 (manufactured by Shimadzu Corporation), the BET specific surface area of each of the various catalysts was measured.

The results of the above measurements are shown in Table 1.

TABLE 1

| CATALYST | $CeO_2$ CONCENTRATION (wt %) | $ZrO_2$ CONCENTRATION (wt %) | $WO_3$ CONCENTRATION (wt %) | BET SPECIFIC SURFACE AREA (m²/g) |
|---|---|---|---|---|
| No. 1 | 5 | 86 | 8 | 75 |
| No. 2 | 10 | 81 | 8 | 73 |
| No. 3 | 20 | 69 | 11 | 83 |
| No. 4 | 30 | 61 | 10 | 80 |
| No. 5 | 50 | 41 | 10 | 63 |
| No. 6 | 25 | 75 | 0 | 125 |
| No. 7 | 20 | 76 | 5 | 59 |
| No. 8 | 20 | 69 | 11 | 83 |
| No. 9 | 20 | 66 | 14 | 88 |
| No. 10 | 20 | 59 | 20 | 96 |
| No. 11 | 49 | 31 | 20 | 47 |
| No. 12 | 70 | 10 | 20 | 51 |
| No. 13 | 17 | 73 | 10 | 58 |
| No. 14 | 17 | 73 | 10 | 50 |
| No. 15 | 20 | 71 | 9 | 39 |
| No. 16 | 20 | 71 | 9 | 15 |
| No. 17 | 20 | 71 | 8 | 53 |
| No. 18 | 20 | 72 | 8 | 30 |

Example 2

After honeycomb-shaped catalysts (●: Fresh) prepared by loading the various catalyst powder Nos. 1 to 18 manufactured in Example 1 on respective honeycomb carriers (cell structure: 6 mil/400 cpsi) or honeycomb-shaped catalysts (▲: 800° C.×3H) prepared by loading the various catalyst powder Nos. 2 to 12 on honeycomb carriers (cell structure: 6 mil/400 cpsi) and heating at 800° C. for 3 hours, were loaded on honeycomb carriers (cell structure: 6 mil/400 cpsi), a denitration reaction test was performed under the following conditions. For the catalyst Nos. 1 to 12, a simulation gas containing 500 ppm of NO, 500 ppm of $NH_3$, 10% of $O_2$, 5% of $H_2O$, and the balance being $N_2$ was used, a space velocity (SV) was set to 50,000/h, and the reaction temperature was set to 400° C. For the catalyst Nos. 13 to 18, a simulation gas containing 500 ppm of NO, 500 ppm of $NH_3$, 10% of $O_2$, 5% of $H_2O$, and the balance of $N_2$ was used. The space velocity (SV) was set to 100,000/h, and the reaction temperature was set to 500° C.

Figure 2:
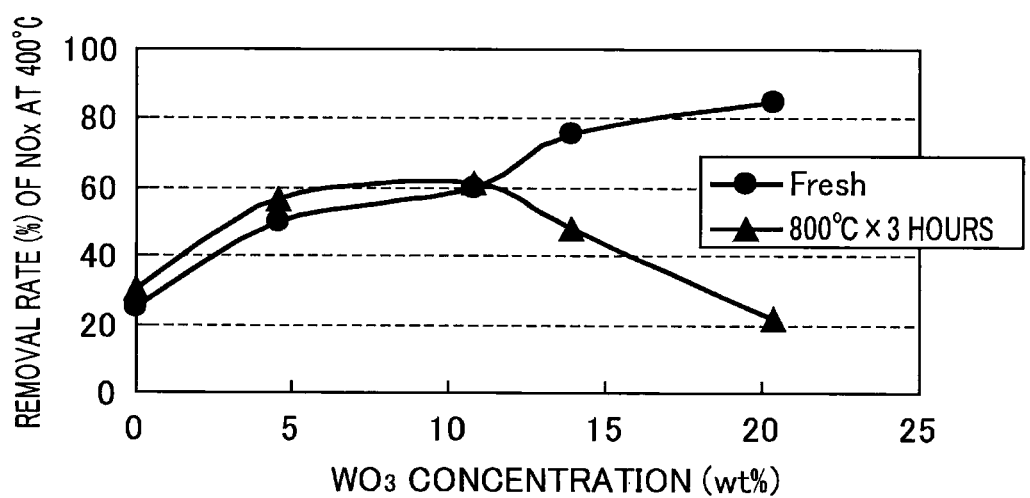
FIG. 2 is a view showing the results obtained by examination of the change in nitrogen-oxide removal rate with the concentration of tungsten oxide contained in a catalyst in which cerium oxide is contained at a preferable concentration, according to one example of the present invention.
Figure 3:
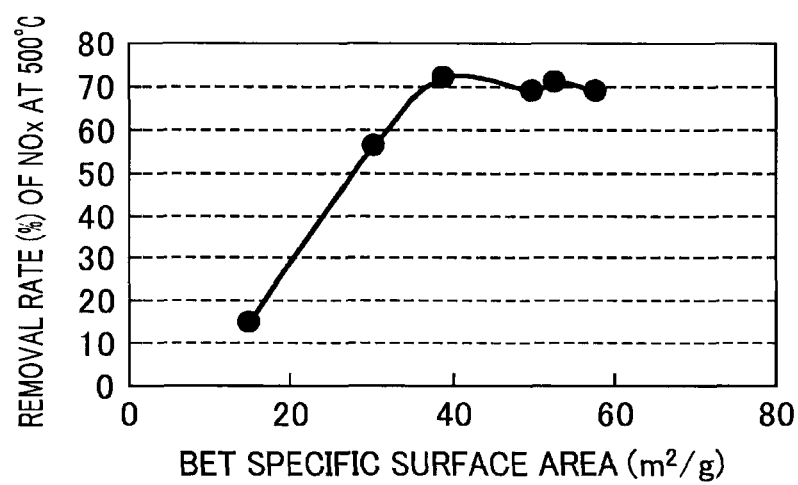
FIG. 3 is a view showing the results obtained by examination of the change in nitrogen-oxide removal rate with a BET specific surface area of a catalyst, according to one example of the present invention.

These results are shown in Tables 2 and 3 and FIGS. 1 to 3.

TABLE 2

| CATALYST | NITROGEN-OXIDE REMOVAL RATE AT 400° C. (%) | |
| --- | --- | --- |
| | Fresh | 800° C. × 3 HOURS |
| No. 1 | 35 | |
| No. 2 | 53 | 47 |
| No. 3 | 60 | 61 |
| No. 4 | 65 | 55 |
| No. 5 | 69 | 41 |
| No. 6 | 25 | 30 |
| No. 7 | 50 | 56 |
| No. 8 | 74 | 60 |
| No. 9 | 76 | 48 |
| No. 10 | 85 | 22 |
| No. 11 | 80 | 18 |
| No. 12 | 74 | 16 |

TABLE 3

| CATALYST | NITROGEN-OXIDE REMOVAL RATE AT 500° C. (%) |
| --- | --- |
| No. 13 | 69 |
| No. 14 | 69 |
| No. 15 | 72 |
| No. 16 | 15 |
| No. 17 | 71 |
| No. 18 | 56 |

As shown in Table 2 and FIG. 1, it was found that the catalyst containing 10 to 30 percent by weight of cerium oxide showed high initial catalytic activity (high removal rate of $NO_x$ by the catalyst in the Fresh state) and had superior heat resistance because the decrease in catalytic activity caused by a heat treatment at 800° C. for 3 hours was small. In addition, as shown in Table 2 and FIG. 2, it was found that in the catalyst in which cerium oxide was contained at a preferable concentration (20 to 25 percent by weight), when 5 to 14 percent by weight of tungsten oxide was contained, more superior properties in terms of initial catalytic activity and heat resistance were obtained. From the results described above, it was shown that a catalyst containing a complex metal oxide composed of tungsten oxide, zirconium oxide, and cerium oxide and containing 10 to 30 percent by weight of cerium oxide and 5 to 14 percent by weight of tungsten oxide had high catalytic activity and superior durability against heat. Furthermore, as shown in Table 3 and FIG. 3, it was also found that when the BET specific surface area was 30 $m^2/g$ or more, high catalytic activity could be obtained.

INDUSTRIAL APPLICABILITY

According to the present invention, a catalyst having superior heat resistance and being capable of efficiently removing a nitrogen oxide, a removing method using the same, an apparatus including the above catalyst, and the like can be provided.

The invention claimed is:

1. A nitrogen-oxide removal catalyst for removing a nitrogen oxide in the presence of ammonia, comprising a complex metal oxide containing tungsten oxide, zirconium oxide, and cerium oxide and having heat resistance to a heat treatment at 800° C. for 3 hours, wherein the content of the cerium oxide is 10 to 30 percent by weight, the content of the zirconium oxide is 61 to 81 percent by weight, and the content of the tungsten oxide is 5 to 14 percent by weight, and the catalyst has a BET specific surface area of 30 $m^2/g$ or more.

2. The nitrogen-oxide removal catalyst according to claim 1, wherein the catalyst has a BET specific surface area of 39 $m^2/g$ or more.

3. The nitrogen-oxide removal catalyst according to claim 1 or 2, wherein the nitrogen-oxide removal catalyst is supported by a honeycomb carrier.

4. A method for removing a nitrogen-oxide comprising:
bringing a nitrogen oxide and ammonia into contact with the nitrogen-oxide removal catalyst according to claim 1 for denitration by reduction.

5. An apparatus for removing a nitrogen-oxide comprising: the nitrogen-oxide removal catalyst according to claim 1.

6. The method according to claim 4, wherein the nitrogen-oxide removal catalyst has a BET specific surface area of 39 $m^2/g$ or more.

7. The method according to claim 4, wherein the nitrogen-oxide removal catalyst is supported by a honeycomb carrier.

8. The apparatus according to claim 5, wherein the nitrogen-oxide removal catalyst has a BET specific surface area of 39 $m^2/g$ or more.

9. The apparatus according to claim 5, wherein the nitrogen-oxide removal catalyst is supported by a honeycomb carrier.

* * * * *